United States Patent
Gódor et al.

(10) Patent No.: US 9,204,389 B2
(45) Date of Patent: Dec. 1, 2015

(54) METHODS, DEVICE AND NODE FOR DRX OF DATA

(71) Applicant: Telefonaktiebolaget L M Ericsson (publ), Stockholm (SE)

(72) Inventors: István Gódor, Budapest (HU); Magnus Olsson, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 198 days.

(21) Appl. No.: 13/997,806

(22) PCT Filed: Apr. 8, 2013

(86) PCT No.: PCT/SE2013/050378
§ 371 (c)(1),
(2) Date: Jun. 25, 2013

(87) PCT Pub. No.: WO2014/168525
PCT Pub. Date: Oct. 16, 2014

(65) Prior Publication Data
US 2014/0301261 A1    Oct. 9, 2014

(51) Int. Cl.
*H04J 3/06* (2006.01)
*H04W 52/02* (2009.01)
(Continued)

(52) U.S. Cl.
CPC ...... *H04W 52/0216* (2013.01); *H04W 52/0229* (2013.01); *H04W 52/0241* (2013.01); *H04W 4/005* (2013.01); *H04W 72/1289* (2013.01); *H04W 76/048* (2013.01)

(58) Field of Classification Search
USPC .......................... 370/311, 508, 310, 503, 516
See application file for complete search history.

(56) References Cited

U.S. PATENT DOCUMENTS 8,467,323 B2 *   6/2013   Perraud et al. ................ 370/310
8,743,720 B2 *   6/2014   Lee et al. ...................... 370/252
(Continued)

FOREIGN PATENT DOCUMENTS

EP      2131619 A2    12/2009
EP      2351407        8/2011
(Continued)

OTHER PUBLICATIONS

Motorola, "System simulation results with non-static TTI", 3GPP TSG RAN1 LTE Ad Hoc, Cannes, France, Jun. 27, 2006, pp. 1-8, R1-061715, 3GPP.
(Continued)

*Primary Examiner* — Phuc Tran
(74) *Attorney, Agent, or Firm* — Coats & Bennett, P.L.L.C.

(57) ABSTRACT

A method performed by a radio communication device for discontinuous reception, DRX, of data from a radio network node is disclosed. When information, indicating that data is scheduled to the radio communication device in a DRX cycle, is received (102, 104(Y)) during an initial part of a DRX cycle, a receiver of the radio communication device is activated (110) at the time data is received and deactivated (110) when data is not received. When information is not received (104(N)) or when the information indicates that no data is scheduled (108(N)) during a remaining part of the DRX cycle, the receiver is kept (106) deactivated. A method performed by the radio network node for enabling DRX of data by the radio communication device is disclosed, as well as the radio communication device and the radio network node. Micro sleep during single time slices, such as time slots, is enabled.

15 Claims, 4 Drawing Sheets

(51) Int. Cl.
*H04W 4/00* (2009.01)
*H04W 72/12* (2009.01)
*H04W 76/04* (2009.01)

(56) References Cited

U.S. PATENT DOCUMENTS

| | | | |
|---|---|---|---|
| 8,787,231 B2* | 7/2014 | Jeong et al. | 370/311 |
| 8,824,347 B2* | 9/2014 | Pelletier et al. | 370/311 |
| 8,908,714 B2* | 12/2014 | Vujcic | 370/458 |
| 2007/0189332 A1 | 8/2007 | Phan et al. | |
| 2011/0176466 A1 | 7/2011 | Lindoff et al. | |

FOREIGN PATENT DOCUMENTS

| | | |
|---|---|---|
| KR | 20100051023 A | 5/2010 |
| WO | 2006002658 A1 | 1/2006 |
| WO | 2009024925 A2 | 2/2009 |
| WO | 2010053308 A2 | 5/2010 |
| WO | 2012048717 A1 | 4/2012 |
| WO | 2012131568 A2 | 10/2012 |
| WO | 2013006196 A1 | 1/2013 |

OTHER PUBLICATIONS

Motorola, "Variable TTI for LTE", 3GPP TSG RAN WG1#44, Denver, USA, Feb. 13, 2006, pp. 1-5, R1-060394, 3GPP.

3rd Generation Partnership Project, "3rd Generation Partnership Project; Technical Specification Group Radio Access Network; Evolved Universal Terrestrial Radio Access (E-UTRA); Medium Access Control (MAC) protocol specification (Release 11)", Technical Specification, 3GPP TS 36.321 V11.2.0, Mar. 1, 2013, pp. 1-56, 3GPP,France.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Technical Specification, 3GPP TS 36.300 V11.5.0, Mar. 1, 2013, pp. 1-209, 3GPP, France.

Jha, S. C., et al., "Optimization of Discontinuous Reception (DRX) for Mobile Internet Applications Over LTE", 2012 IEEE Vehicular Technology Conference (VTC Fall), Sep. 3, 2012, pp. 1-5, Quebec City, QC, IEEE.

* cited by examiner

Fig. 1

| ID | 0 | 1 | 2 | 3 | 4 | 5 | 6 | 7 | 8 | 9 |
|---|---|---|---|---|---|---|---|---|---|---|
| DEVICE 1 | Y | N | N | Y | N | N | N | N | N | N |
| DEVICE 2 | N | Y | Y | N | N | N | N | N | N | N |
| DEVICE 3 | N | N | N | N | Y | Y | N | N | N | N |

METHODS, DEVICE AND NODE FOR DRX OF DATA

TECHNICAL FIELD

This disclosure relates to methods, device and node for discontinuous reception (DRX) of data.

BACKGROUND

Today, networked devices, such as user terminals, machines, wireless sensors, etc., are assumed to be always on-line and to be always reachable.

This means that whenever a device wants to communicate or wants to be able to receive any data, such as messages, the device has to be connected to the network. Since most of the devices connected to mobile networks are normally powered by batteries, their energy efficiency requires that the duration of active communication is minimized. This is especially important for machine-type communication or wireless sensors, where the battery in some cases is supposed to last the full lifetime of the device. This means that a single battery may have to last several years.

In the design of legacy communication systems, it is well known to apply a DRX technique to reduce the time for active communication of devices. This is generally made by periodically switching off the receiver of the device, until again switching on the receiver and listening to a control channel, for instance the physical downlink control channel (PDCCH) in long-term evolution (LTE), to find out whether there is new data scheduled for the device, or not. DRX algorithms are also used in other communication standards of various different generations, such as global system for mobile communications, high-speed packet access, and worldwide interoperability for microwave access, to mention a few.

Current techniques are typically controlled by timers in a cyclic manner. Each cycle, also called DRX cycle, occurs with a periodicity of tens of milliseconds (ms). A DRX cycle typically comprises an on-duration period, and an inactivity period. Every listening period lasts a predefined period of time to find out whether any data is scheduled for the device. This period of time is the on-duration period and lasts typically a few milliseconds. If data is scheduled, the device will be kept active to wait for further data even though there is no more data scheduled for the device. This time period is the inactivity period, and lasts typically in the order of one hundred milliseconds. The setting of length of the time periods involves a trade-off between reducing battery power consumption and latency of any scheduled data. The absolute value of these time periods may be subject to changes in the future, but their relative ratio is assumed to be similar as today.

For DRX techniques employing timers, the timers are usually set to reasonably large values, such as the values given above, to provide enough time space for a scheduler to effectively schedule communication into time-frequency resource blocks.

This has the effect that the devices need to be in active mode throughout reasonably long listening windows even though no data is scheduled for them. This leads to unnecessary battery power consumption and shorter battery life.

SUMMARY

It is an object of example embodiments of the invention to address at least some of the issues outlined above, and to eliminate the need of major timers which are applied in conventional techniques of today. This object and others are achieved by the method and the device according to the appended independent claims, and by the embodiments according to the dependent claims.

A first example embodiment provides a method performed by a radio communication device for DRX of data from a radio network node of a wireless communications system. The method comprises to determine whether information is received from the radio network node at an initial part of a DRX cycle. The information indicates whether data is scheduled to the radio communication device during a remaining part of the DRX cycle. If said information is not received, a receiver of the radio communication device is kept deactivated throughout the remaining part of the DRX cycle. If said information is received and the information indicates that no data is scheduled, the receiver is kept deactivated throughout the remaining part of the DRX cycle. If said information is received and the information indicates that data is scheduled, for the remaining part of the DRX cycle, the receiver is activated when data is scheduled and deactivated when data is not scheduled.

The information may indicate where data is scheduled during the remaining part of the DRX cycle.

The method may further comprise identifying when data is scheduled.

The method may further comprise identifying when data is not scheduled.

The initial part of the DRX cycle of the method may further comprise the first time slice of the DRX cycle.

The information may be received from the radio network node over a downlink control channel.

A second example embodiment provides a radio communication device that is configured for DRX of data from a radio network node of a wireless communications system. The radio communication device comprises a receiver that is configured to receive information from the radio network node at an initial part of a DRX cycle, wherein the information indicates whether data is scheduled to the radio communication device during a remaining part of the DRX cycle. The radio communication device also comprises a control unit that is configured to be connected to the receiver and to determine whether said information is received from the radio network node at the initial part of the DRX cycle. The control unit is further configured to keep the receiver of the radio communication device deactivated throughout the remaining DRX cycle, if said information is not received. It is also configured to keep the receiver deactivated throughout the remaining part of the DRX cycle, if said information is received and the information indicates that no data is scheduled. In addition, it is configured to, for the remaining part of the DRX cycle, activate the receiver when data is scheduled and deactivate the receiver when data is not scheduled, if said information is received and the information indicates that data is scheduled.

The receiver of the radio communication device may be configured to receive said information over a downlink control channel from the radio network node.

A third example embodiment provides a method performed by a radio network node for enabling DRX of data by a radio communication device of a wireless communications system. The method comprises sending information to the radio communication device at an initial part of a DRX cycle, wherein the information indicates whether data is scheduled to the radio communication device during a remaining part of the DRX cycle.

The information may indicate that no data is scheduled throughout the DRX cycle, or that data is scheduled to the radio communication device during the remaining part of the DRX cycle.

The information may further indicate where data is scheduled.

The method may comprise sending the information over a downlink control channel from the radio network node.

The information may further indicate that the data is scheduled into resource blocks over several frequency bands within a time slot, achieving another time slot during which no data is scheduled to the radio communication device, enabling a receiver of the radio communication device to be deactivated during said another time slot.

A fourth example embodiment provides a radio network node for enabling DRX of data by a radio communication device of a wireless communications system. The radio network node comprises a transmitter that is configured to transmit information to the radio communication device at the initial part of the DRX cycle, wherein the information indicates whether data is scheduled to the radio communication device during a remaining part of the DRX cycle.

The information as sent by the radio network node may further indicate that data is scheduled over several frequency bands within a time slice of the remaining part of the DRX cycle, achieving another time slice of the remaining part of the DRX cycle, during which another time slice no data is scheduled to the radio communication device.

The embodiments of the invention disclosed herein aim to resolve the problem of unnecessary battery power consumption and shorter battery life, by eliminating the need of major timers which are applied in conventional techniques of today.

It is advantageous with example embodiments that radio communication devices such as user equipment, terminals, machines, wireless sensors, can drastically reduce their active time and thereby reduce battery power consumption and improve battery lifetime.

By providing a possibility to deactivate a receiver during a time slice, such as half a sub-frame, in the so-called micro sleep, it can be shown that the reduction of active time can be further increased.

BRIEF DESCRIPTION OF THE DRAWINGS

Example embodiments will now be described in more detail, and with reference to the accompanying drawings, in which.

DETAILED DESCRIPTION

In the following description, different example embodiments of the invention will be described in more detail, with reference to accompanying drawings. For the purpose of explanation and not limitation, specific details are set forth, such as particular scenarios and techniques in order to provide a thorough understanding.

Battery power consumption is crucial for devices in which a built-in battery is supposed to last the entire lifetime of each device.

Herein, an approach based on DRX of data is presented. DRX is in general a technique by which a device can be switched between a power consuming active mode, and a less power consuming passive mode. Usually in DRX, major timers control an on-duration period as well as an in-activity period. As described above, in conventional DRX techniques the effectiveness is relatively low. This is often due to that the on-duration timer and the in-activity timer should be set to reasonably large values to provide time space for scheduling. A device has to be active throughout the on-duration period and if any data is scheduled during the on-duration period, the device has to be active throughout the in-activity period also, even though only a single packet was scheduled to the device during the on-duration period.

The approach as presented herein has the advantage that the time during which the device is activated, i.e. in active mode, can be reduced as compared to conventional DRX techniques. The technique further eliminates the need of major timers.

Herein, the timer that controls the on-duration time period and the timer controlling the inactivity time period can be eliminated from DRX techniques. This is accomplished by providing information, such as a pointer, that can indicate what general time slice, such as LTE sub-frame or time slot, will comprise data for a particular device. Since the receiver of the device can be deactivated in all time slices, e.g., time slots or sub-frames, without user data for the particular device, the time duration for which the receiver needs to be activated can be significantly reduced.

In high-speed packet access, the time slice can be the transmission time interval. In general, a time slice is the smallest unit in time during which radio resources can be scheduled.

In previously known DRX techniques using timers, data scheduling is performed by scheduling data to the first sub-frame(s) in each radio frame, in order not to unnecessarily consume battery power.

According to embodiments of the present invention data scheduling can be made looser, since there is no urge to schedule data to the first sub-frame(s) of the radio frame. As described above, data can be scheduled in any sub-frame(s) by letting the information or pointer explicitly indicate at what time instance data is scheduled to a particular user.

This disclosure relates to DRX of data from a radio network node by a radio communication device. The disclosure also relates to a technique for enabling DRX of data by a radio communication device, wherein the technique is performed by a radio network node.

This disclosure is also related to the radio communication device that is configured for DRX of data from a radio network node of a wireless communications system, as well as to the radio network node that is configured to enable DRX of data by a radio communication device of the wireless communications system.

Embodiments of the present invention propose a modified DRX technique in which information, such as a pointer, is used to indicate when data is scheduled to a radio communication device. The radio communication device may be any device comprising a radio receiver and is not limited to the following examples of a user equipment, a terminal, a machine, a wireless sensor, or even a refrigerator or a washing machine as can be foreseen in a networked society.

This technique is applicable to devices which can enter a DRX mode, i.e. in a mode in which the device seeks to enter a sleep mode, based on the presence of data being scheduled to the device.

Once into the DRX mode, the device periodically activates the receiver and monitors a control channel for the information or the pointer. The information may comprise an information element (IE) of the control channel. The channel may be the physical downlink control channel (PDCCH) in LTE.

Based on the information indicating when data is scheduled to the device, the device can determine when to activate the receiver and when to keep the receiver deactivated.

Figure 1:
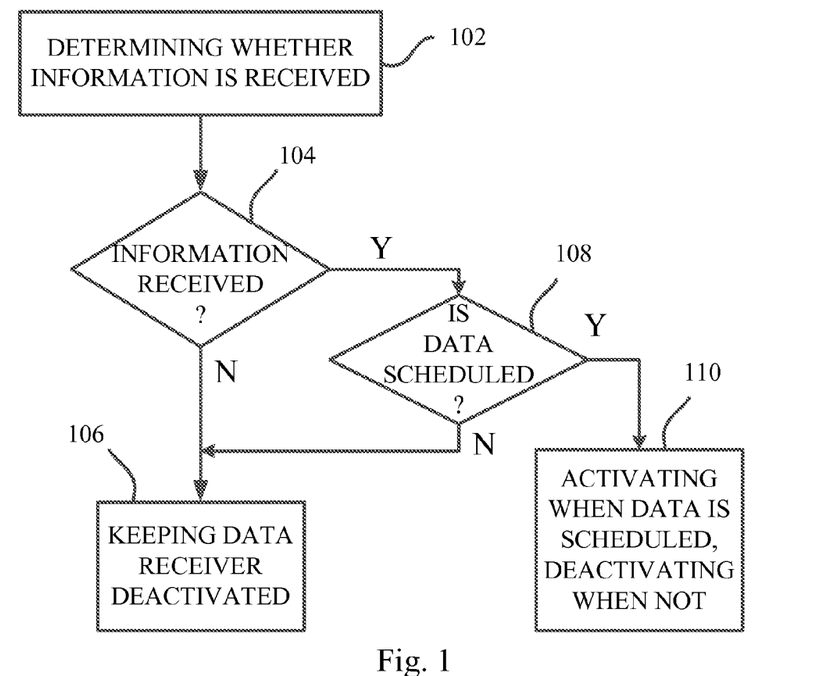
FIGS. 1, 2 and 4 are flowcharts illustrating embodiments of the invention.

FIG. 1 presents a flowchart according to some embodiments of the present invention. The flowchart illustrates a general method performed by a radio communication device for DRX of data from a radio network node of a wireless communications system. In 102 it is determined whether information is received from the radio network node at an initial part of a DRX cycle, where the information indicates whether data is scheduled to the radio communication device during a remaining part of the DRX cycle. If 104 said information is not received, the receiver of the radio communication device is kept deactivated 106 throughout the remaining part of the DRX cycle. If 104 said information is received and the information indicates 108 that no data is scheduled, the receiver is kept deactivated throughout the remaining part of the DRX cycle. If said information is received and the information indicates 108 that data in fact is scheduled, for the remaining part of the DRX cycle, the receiver is activated 110 when data is scheduled, and the receiver is deactivated 110 when data is not scheduled.

It can thus be explicitly indicated in the beginning of each DRX cycle whether a particular device has new data and also when said new data is scheduled to the device.

The information can be received during an initial part of the DRX cycle. The information may be received at the first time slice of the first radio sub-frame of the DRX cycle. By receiving information at the beginning of the DRX cycle, it is known from the start of the DRX cycle when data is scheduled. This is in contrast to DRX techniques using timers, in which the receiver is kept activated until the on-duration period ends.

In the embodiments of the present invention, the receiver of a device only needs to be activated at the initial part of the DRX cycle and when real data is scheduled to the device according to the information as received.

The information may further indicate where data is scheduled during the remaining part of the DRX cycle. Data may be scheduled at various frequencies or frequency intervals.

The information may be received from the radio network node over a downlink control channel, such as the PDCCH.

It is noted that a DRX based technique is periodic since it is determined for each DRX cycle whether data is scheduled to a particular device.

Figure 2:
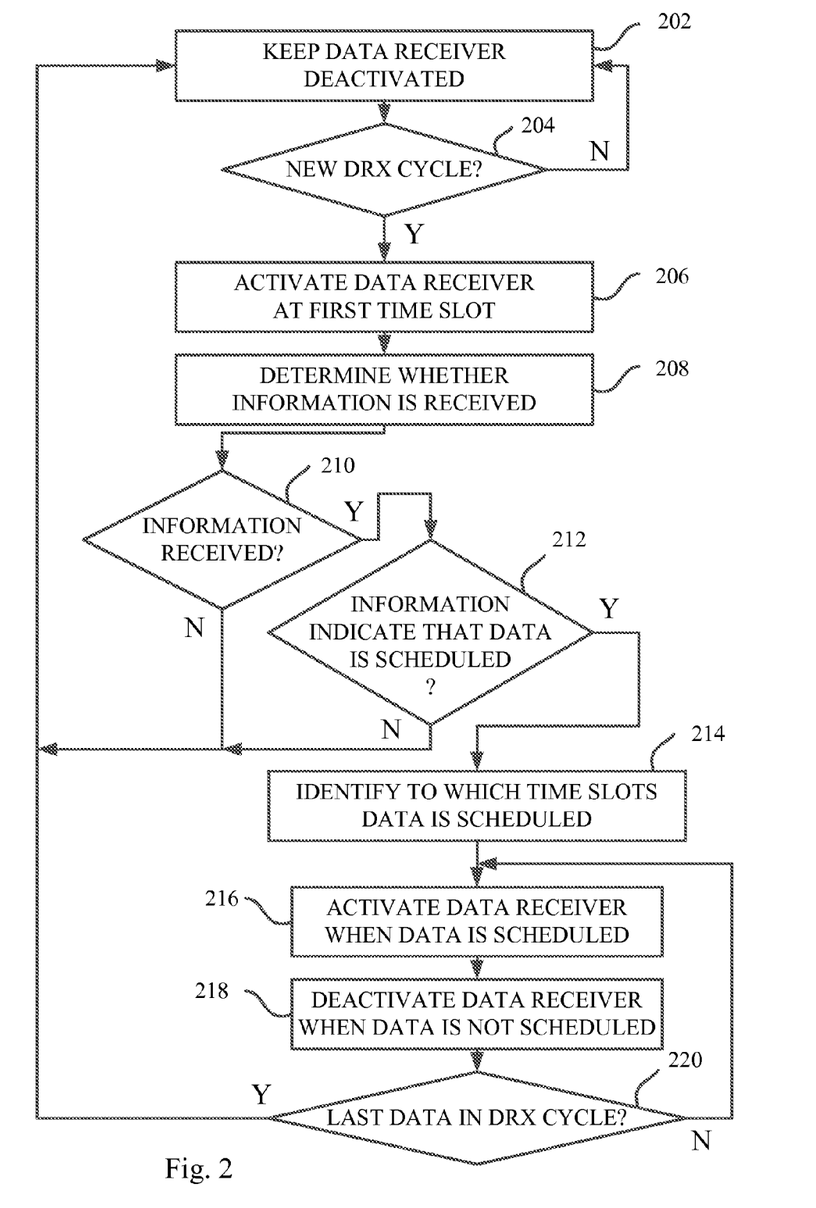

Accordingly, FIG. 2 presents a flowchart of a method being periodically performed according to some embodiments of the invention. The method is performed by a device for DRX of data from a radio network node of a wireless communications system. The flowchart represents one DRX cycle. The flowchart is applicable to devices that have entered a DRX mode, for reducing battery power consumption.

Time slice denotes throughout this description a period in time of a DRX cycle, during which data can be scheduled. For LTE applications time slice may denote a time slot or a sub-frame. In 202 the receiver of the device is kept deactivated. This can be executed at the end of a DRX cycle when no more data is scheduled and the receiver awaits a new DRX cycle.

Thus, unless a new DRX cycle starts 204, the receiver is kept deactivated. When a new DRX cycle starts 204(Y) the receiver is activated at the first time slice of the DRX cycle. This enables the receiver to receive the information. The length of the DRX cycle can be set prior to the execution of the method of FIG. 2. When the length of the DRX cycle is known, the device can thus know at what time a new DRX cycle starts, and hence when to activate the receiver.

Consequently, the receiver is kept deactivated if no new DRX cycle is started 204(N).

When a new DRX cycle starts 204(Y) the receiver is activated 206 at the first time slice. The receiver may alternatively be activated at another time slice. When to activate the receiver for detecting the start of a new DRX cycle, may be signaled via a radio resource control reconfiguration message from the radio network node.

In 208, it is determined whether the information is received during the first time slice. In the case no information is received 210(N) during the first time slice, the receiver is kept deactivated 202 until the start of a new DRX cycle 204(Y). In the case information is received 210(Y), it is determined whether the received information indicates that data is scheduled 212 to the device. In the case the information indicates that no data is scheduled 212(N) the receiver is kept deactivated 202. However, in the case the received information indicates 212(Y) that data is scheduled, it is identified 214 to which time slices data is scheduled. By knowing when data is scheduled and when data is not scheduled, the receiver can be activated 216 when data is scheduled, and deactivated 218 when data is not scheduled.

It may also be explicitly determined when data is not scheduled. If the data was the last scheduled data in the DRX cycle the receiver is kept deactivated in 202. However, if the data was not the last data in the DRX cycle 220, the receiver is activated at the time for next data in 216.

Figure 3:
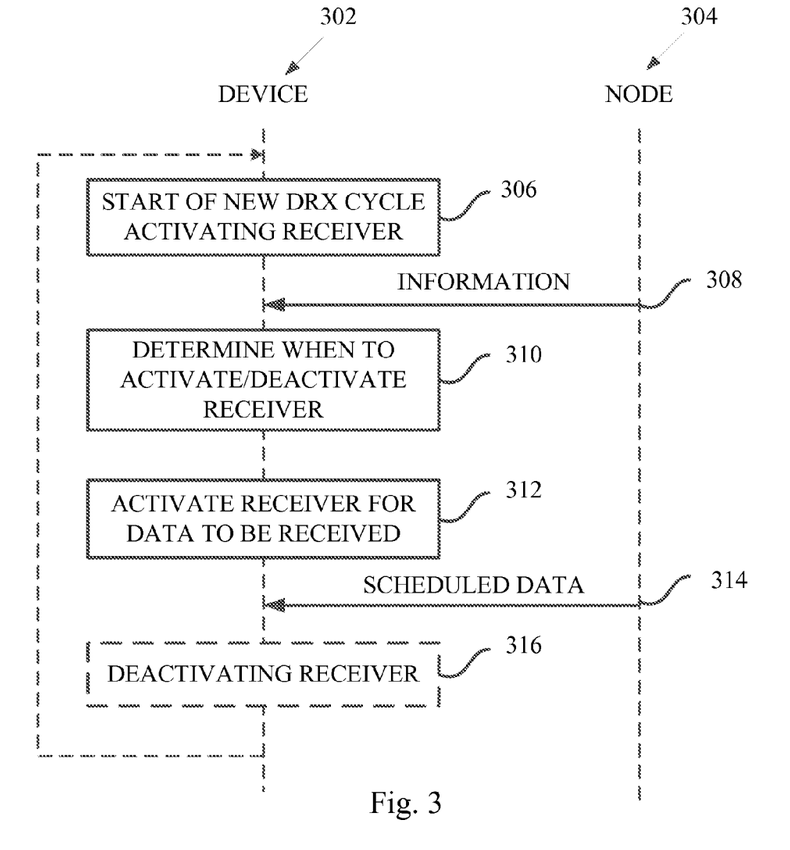
FIG. 3 is a signalling diagram presenting embodiments of the invention.

FIG. 3 presents a signaling diagram of signaling between a radio communication device 302 and a radio network node 304 according to embodiments of the invention. In 306 the radio communication device, here denoted with device, 302, activates a receiver of the device upon the start of a new DRX cycle. While the receiver of the device is activated, information is transmitted 308 by the radio network node 304. Based on the received information, the device determines when to activate/deactivate the receiver. In 312 the receiver is hence activated for data to be received. In 314 scheduled data is transmitted to the radio communication device 302 from the radio network node 304. It is noted that the receiver is activated and deactivated according to the received scheduled data. When data is not scheduled any longer throughout the remaining part of the DRX cycle, the receiver is deactivated 316 until the start of a new DRX cycle 306.

Figure 4:
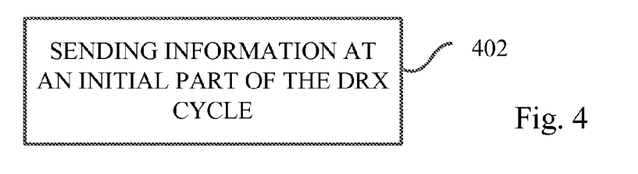

FIG. 4 presents a flow diagram of a method according to some embodiments of the invention. The method is performed by a radio network node for enabling DRX of data by a radio communication device of a wireless communication system. In 402, information is sent to the radio communication device at an initial part of a DRX cycle, where the information indicates whether data is scheduled to the radio communication device during a remaining part of the DRX cycle. The information may be sent as an information element.

The information may be sent over a downlink control channel, such as the PDCCH.

The information may further indicate that no data is scheduled throughout the DRX cycle, or that data is scheduled to the radio communication device during the remaining part of the DRX cycle.

The information may further also indicate where data is scheduled, in addition to when data is scheduled.

The method performed by the radio network node may further comprise scheduling the data into resource blocks over several frequency bands within a time slice, achieving another time slice during which no data is scheduled to the radio communication device, enabling the receiver of the radio communication device to be deactivated during said second time slice.

Figure 5:
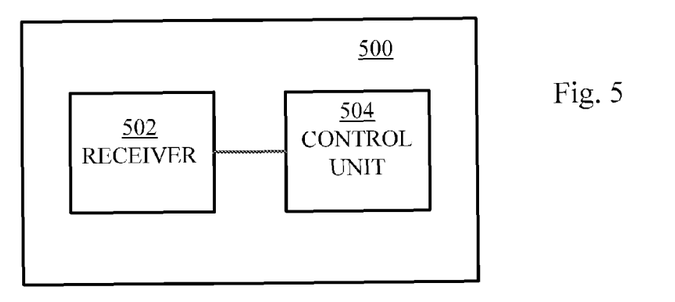
FIGS. 5 and 6 present block diagrams schematically illustrating a radio communication device and a radio network node of the invention, respectively.

FIG. 5 schematically presents a radio communication device 500 according to embodiments of the invention. The radio communication device is configured for DRX of data from a radio network node of a wireless communications system. The radio communication device comprises a receiver 502 that is configured to receive information from the radio network node at an initial part of a DRX cycle, wherein the information indicates whether data is scheduled to the radio communication device during a remaining part of the DRX cycle.

The radio communication device also comprises a control unit 504 that is configured to be connected to the receiver 502 and to determine whether said information is received from the radio network node at the initial part of the DRX cycle.

The control unit 504 is further configured to keep 106, 202 the receiver of the radio communication device deactivated throughout the remaining DRX cycle, if said information is not received. The control unit 504 is further configured to keep 108, 216 the receiver deactivated throughout the remaining part of the DRX cycle, if said information is received 104 and the information indicates that no data is scheduled. In addition, the control unit is further configured to, for the remaining part of the DRX cycle, activate the receiver when data is scheduled and deactivating the receiver when data is not scheduled, if said information is received 104 and the information indicates that data is scheduled.

The receiver 502 may be configured to receive said information over a downlink control channel from the radio network node.

Figure 6:
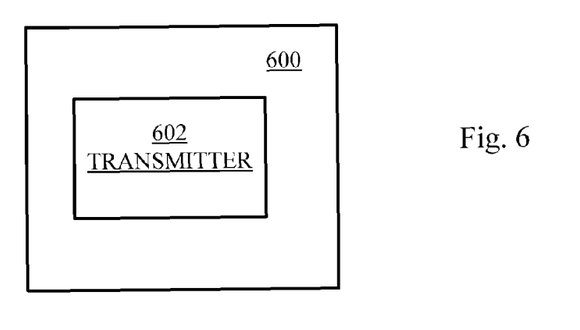

FIG. 6 schematically presents a radio network node 600 according to embodiments of the invention. The radio network node is configured for enabling DRX of data by a radio communication device 500 of a wireless communications system. The radio network node 600 comprises a transmitter 602 that is configured to send information to the radio communication device at an initial part of a DRX cycle, wherein the information indicates whether data is scheduled to the radio communication device during a remaining part of the DRX cycle.

The information may further indicate that data is scheduled over several frequency bands within a time slice, achieving another time slice during which no data is scheduled to the radio communication device.

Figure 7:
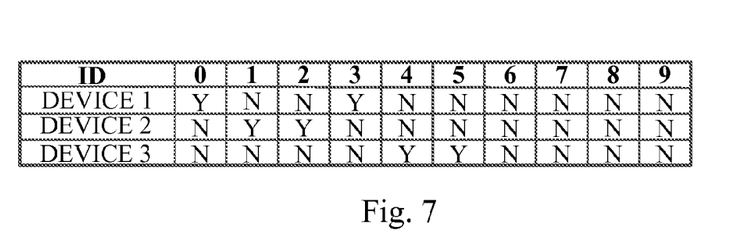
FIGS. 7 and 8, schematically illustrate information indicating whether data is scheduled, according to some embodiments of the invention.

FIG. 7 schematically presents an implementation of information in the form of a pointer list indicating whether data is scheduled to various devices, such as radio communication devices, during sub-frame Nos. 0-9 of a radio frame. Herein for FIG. 7, the LTE nomenclature for time slice, i.e. time slot, together with the radio frame is used. Data is scheduled to device 1 during sub-frame Nos. 0 and 3 only, whereas data is not scheduled during the remaining sub-frames of the radio frame. It is further presented that data is scheduled to device 2 during sub-frame Nos. 1 and 2, while no data is scheduled to device 2 during other times of the radio frame. It is also presented that device 3 only has data scheduled during sub-frame Nos. 4 and 5.

Since the information may indicate when data is scheduled to various devices, it can easily be identified at what times a receiver of a particular device needs to be activated and at what times the receiver of the particular device can be deactivated. For instance, the receiver of device 1 only has to be activated during sub-frame Nos. 0 and 3, whereas it can be deactivated during the remaining sub-frames of the radio frame, i.e. during sub-frames Nos. 1, 2 and 4-9.

Deactivation of a receiver for a time duration can be regarded as a sleep mode for the receiver, during which the receiver does not need to be fully powered by the battery of the device. A deactivated receiver will thus consume less battery power than an activated receiver.

The information as presented above indicates that data can be scheduled to multiple devices during a radio frame. The set of multiple devices can all be served by the same base station.

The information may alternatively only indicate when data is scheduled to a single device.

It is illustrated that data does not need to be scheduled in the first sub-frame(s) of the radio frame or the DRX cycle in general. This is an advantage of the embodiments of the present invention, as compared to conventional DRX techniques based on timers.

The information indicating whether data is scheduled to a particular device, may be provided more frequently than once per radio frame.

In cellular communication systems, user data is typically scheduled to provide the best achievable performance, such as highest throughput. However, devices residing in a DRX mode do not necessarily require the best performance momentarily achievable. If this is the case, it is possible to group the scheduling of data into, for instance, resource blocks at the same time but at several frequency bands or intervals. By, for instance, scheduling the data to one half of a sub-frame per device, each device may be deactivated for a micro sleep during the other half of the sub-frame when no data is scheduled. One half of a radio sub-frame corresponds in LTE to one time slot of 0.5-ms duration.

Allowing micro sleep for receivers in cellular communication systems is believed to become more important and efficient in future implementations.

Figure 8:
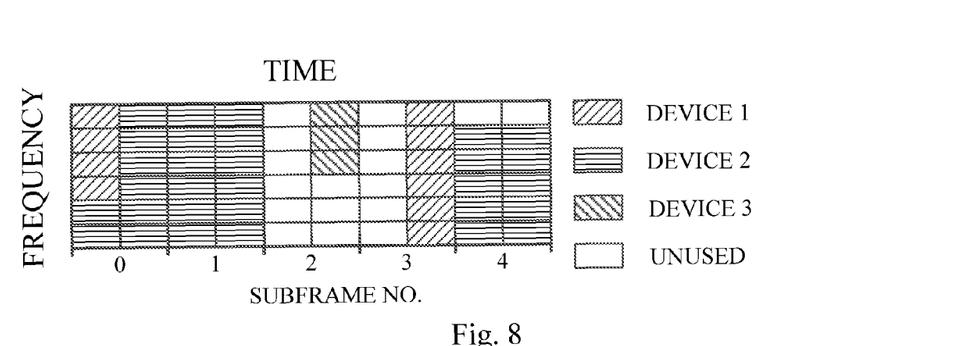

FIG. 8 schematically presents information that indicates grouping of scheduled data in time to allow deactivation, i.e. micro sleep, within sub-frames of a radio frame. The figure schematically presents an example of information indicating whether data is scheduled to various devices during a few sub-frames. It is presented that the example information has a time dimension as well as a frequency dimension.

This information is sent from the radio network node to the radio communication device at an initial part of a DRX cycle, where the information indicates whether data is scheduled to the radio communication device during a remaining part of the DRX cycle.

The nomenclature as used in FIG. 8 is compatible with LTE, hence time slice is denoted time slot. Enabling so called sleep for the shortest unit in time is however applicable to other time division based access techniques also.

If data is scheduled to a device at a first time slot, and no data is scheduled at any frequency at another time slot, the receiver of said device can be deactivated throughout said another time slot.

If data is not scheduled at any frequencies for a number of consecutive time slots for a certain device, the receiver of said device can thus be deactivated for said number of consecutive time slots, which obviously leads to reduced battery power consumption as compared to having the receiver activated during the same time.

The information as schematically presented in FIG. 8, indicates that device 1 can be deactivated, i.e. enter a sleep mode, in the second half of sub-frame No. 0, and in the first half of sub-frame No. 3. The second half of sub-frame No. 0, is the second time slot of the radio frame. The first half of sub-frame No. 3 is the seventh time slot of the radio frame.

Within this example, device 2 requires a high data rate for download. Therefore, once device 2 has any data, it is scheduled according to the best practice without any possibility to sleep during the active sub-frames.

Device 3 has only limited amount of data, which means that the data can be scheduled during the second half of sub-frame No. 2, for which reason the device can sleep under the first half of the sub-frame No. 2.

It is noted that each device can be deactivated throughout the sub-frames in which there is no data scheduled to the device.

Moreover, in the case that no information indicating whether data is scheduled, is received during an initial part of the DRX cycle, alternatively, that information is received during the initial part of DRX cycle and the information indicates that no data is scheduled during any time slots, the receiver of all devices can be kept deactivated until the initial part of the following DRX cycle.

It is an advantage with example embodiments that radio communication devices such as user equipment, terminals, machines, wireless sensors etc. can drastically reduce their active time and thereby save battery power and thereby improve battery lifetime.

By providing a possibility to deactivate a receiver during half a sub-frame, the so-called micro sleep, it can be shown that the reduction of active time can be further increased.

It is noted that the example embodiments as described above present techniques that are backward compatible with timer-based DRX techniques. In order to do so, the on-duration timer as used in conventional DRX techniques can be emulated by information, for instance in the form of a pointer or an information element, to indicate data for devices throughout the on-duration time, even if there will not be any data scheduled for the device. In the case there is data scheduled in reality during the on-duration timer, information is also formed and sent to the radio communication device to indicate data scheduled to the device during the "in-activity period", to provide backward compatibility of the example embodiments.

It is also noted that the length of the DRX cycle period can be tuned to particular needs of applications on the device. The proposed embodiments of the technique as presented herein are compatible with any techniques for optimizing the length of the DRX cycle period. This has direct bearing to when a receiver of the device has to be activated to be able to receive information indicating whether data is scheduled to the device. For example, in case of streaming applications, proper settings of the length of the DRX cycle could reduce the additional delay that is introduced by any DRX techniques by definition.

It is noted that the above described embodiments enable micro sleep during single time slices that may even have shorter time duration than the time slots of LTE of today.

It may be further noted that the above described embodiments are only given as examples and should not be limiting to the present invention, since other solutions, uses, objectives, and functions are apparent within the scope of the invention as claimed in the accompanying patent claims.

ABBREVIATIONS

DRX—discontinuous reception
IE—information element
LTE—long-term evolution
PDCCH—physical downlink control channel

The invention claimed is:

1. A method, performed by a radio communication device for discontinuous reception (DRX) of data from a radio network node of a wireless communications system, the method comprising:
   determining whether information is received from the radio network node during an initial part of a DRX cycle, the information indicating whether data is scheduled to the radio communication device during a remaining part of the DRX cycle, wherein the DRX cycle comprises a plurality of time slices;
   in response to the information not being received, keeping a receiver of the radio communication device deactivated throughout the remaining part of the DRX cycle;
   in response to the information being received and indicating that no data is scheduled for the radio communication device, keeping the receiver deactivated throughout the remaining part of the DRX cycle;
   in response to the information being received and indicating that data is scheduled for the radio communication device for the remaining part of the DRX cycle, activating the receiver for the time slices of the remaining part of the DRX cycle in which data is scheduled and deactivating the receiver for the time slices of the remaining part of the DRX cycle in which data is not scheduled.

2. The method of claim 1, wherein the information further indicates where data is scheduled for the radio communication device during the remaining part of the DRX cycle.

3. The method of claim 1, further comprising, in response to the information being received and indicating that data is scheduled for the radio communication device, identifying to which time slices of the remaining part of the DRX cycle data is scheduled for the radio communication device based on the information.

4. The method of claim 1, further comprising identifying to which time slices of the remaining part of the DRX cycle data is not scheduled for the radio communication device based on the received information.

5. The method of claim 1:
   wherein each of the plurality of time slices corresponds to the smallest unit in time of scheduled radio resources;
   wherein the plurality of time slices including a sequentially first time slice;
   wherein the initial part of the DRX cycle comprises just the first time slice of the DRX cycle.

6. The method of claim 1, wherein the information is received from the radio network node over a downlink control channel.

7. A radio communication device configured for discontinuous reception (DRX) of data from a radio network node of a wireless communications system, the radio communication device comprising:
   a receiver configured to receive information from the radio network node at an initial part of a DRX cycle, the information indicating whether data is scheduled to the radio communication device during a remaining part of the DRX cycle, wherein the DRX cycle comprises a plurality of time slices;
   a control circuit connected to the receiver and configured to determine whether the information is received from the radio network node at the initial part of the DRX cycle;

wherein the control unit further is configured to:
in response to the information not being received, keep the receiver of the radio communication device deactivated throughout the remaining part of the DRX cycle;
in response to the information being received and the information indicating that no data is scheduled for the radio communication device, keep the receiver deactivated throughout the remaining part of the DRX cycle;
in response to the information being received and the information indicating that data is scheduled for the radio communication device, for the remaining part of the DRX cycle, activate the receiver for the time slices of the remaining part of the DRX cycle in which data is scheduled and deactivate the receiver for the time slices of the remaining part of the DRX cycle in which data is not scheduled.

8. The radio communication device of claim 7, wherein the receiver is configured to receive the information over a downlink control channel from the radio network node.

9. A method, performed by a radio network node, for enabling discontinuous reception (DRX) of data by a radio communication device of a wireless communications system, the method comprising:
the radio network node sending information to the radio communication device at an initial part of a DRX cycle, the information indicating whether data is scheduled to the radio communication device during a remaining part of the DRX cycle, wherein the DRX cycle comprises a plurality of time slices;
wherein each of the plurality of time slices corresponds to the smallest unit in time of scheduled radio resources;
wherein the plurality of time slices including a sequentially first time slice; and
wherein the initial part of the DRX cycle comprises just the first time slice of the DRX cycle.

10. The method of claim 9, wherein the information indicates that no data is scheduled to the radio communication device throughout the DRX cycle.

11. The method of claim 9, wherein the information further indicates where data is scheduled during the remaining part of the DRX cycle.

12. The method of claim 9, wherein the sending comprises sending the information over a downlink control channel from the radio network node to the radio communication device.

13. The method of claim 9, wherein the information further indicates that data is scheduled for the radio communication device into resource blocks over several frequency bands within a time slice of the remaining part of the DRX cycle, such that another time slice of the remaining part of the DRX cycle has no data scheduled to the radio communication device, thereby enabling a receiver of the radio communication device to be deactivated during the another time slice.

14. A radio network node for enabling discontinuous reception (DRX) of data by a radio communication device of a wireless communications system, the radio network node comprising:
a transmitter configured to transmit information to the radio communication device at an initial part of the DRX cycle, the information indicating whether data is scheduled to the radio communication device during a remaining part of the DRX cycle, wherein the DRX cycle comprises a plurality of time slices;
wherein each of the plurality of time slices corresponds to the smallest unit in time of scheduled radio resources;
wherein the plurality of time slices including a sequentially first time slice; and
wherein the initial part of the DRX cycle comprises just the first time slice of the DRX cycle.

15. The radio network node of claim 14, wherein the information indicates that data is scheduled over several frequency bands within a time slice during the remaining part of the DRX cycle such that another time slice of the remaining part of the DRX cycle has no data scheduled to the radio communication device.

* * * * *